O. P. DOWNING.
VEHICLE WHEEL.
APPLICATION FILED MAR. 24, 1913.

1,173,491.

Patented Feb. 29, 1916.
4 SHEETS—SHEET 1.

O. P. DOWNING.
VEHICLE WHEEL.
APPLICATION FILED MAR. 24, 1913.

1,173,491.   Patented Feb. 29, 1916.
4 SHEETS—SHEET 4.

Witnesses

Inventor
O. P. Downing.
By
Attorneys.

UNITED STATES PATENT OFFICE.

OTTO P. DOWNING, OF HOUSTON, TEXAS, ASSIGNOR TO DOWNING PNEUMATIC WHEEL COMPANY, A CORPORATION OF ARIZONA.

VEHICLE-WHEEL.

1,173,491.  Specification of Letters Patent.  Patented Feb. 29, 1916.

Application filed March 24, 1913. Serial No. 756,503.

*To all whom it may concern:*

Be it known that I, OTTO P. DOWNING, citizen of the United States, residing at Houston, in the county of Harris and State of Texas, have invented certain new and useful Improvements in Vehicle-Wheels, of which the following is a specification.

My invention relates to resilient wheels and particularly to that class of wheel wherein a pneumatic cushion disposed between the hub and the rim or felly receives the impact or thrust of the spokes as set forth in my prior Patent No. 993,659 of May 30, 1911, upon which the construction to be now described is an improvement.

The primary object of my invention is to improve the general construction of the wheel so that it may be more cheaply and easily manufactured and so that the parts may be more readily assembled or taken apart.

A further object is to so construct the wheel that its resiliency will be increased both in relation to the usual pneumatic tired wheel as commonly used upon automobiles and in relation to the wheel illustrated and described in my prior patent.

A further object is to so construct the wheel as to provide an outer section movable with relation to the central or hub section radially, tangentially and circumferentially, and an intermediate pneumatic cushion, and in this connection to so construct this wheel that while the hub section and outer rim section or felly will always have driving engagement with the hub, yet the rim section will have a certain freedom of movement radially and tangentially whereby the wheel is cushioned against vertical direct jars and shocks and also shocks delivered in lines extending upward and rearward through the wheel, as when the wheel engages with a relatively high obstruction.

A further object is to provide a bearing ring for the pneumatic casing so constructed as to provide for easily slipping this floating ring into place upon the hub of the wheel without danger of the bearing ring becoming jammed.

A further object is to provide a pneumatic cushion of the clencher type and provide a bearing ring so constructed as to clench over the flanges of this pneumatic tube or cushion to thereby engage the pneumatic cushion with the ring and hold the split or joint of the tube closed.

A still further object is to provide in connection with the ring and tube, an air pipe adapted to be connected to an air pump and to provide in the outer casing or face plate of the hub portion of the wheel an opening closed by a detachable cap whereby access to the air pipe may be secured.

Another object is to provide a detachable cap inclosing the end of the hub and so formed that the air pipe cap in the casing before referred to will lock this hub cap in place, this hub cap in turn engaging over the front casing plate and holding it in place upon the hub.

A further object is to so construct the wheel that it may be made of sheet metal sections so designed that maximum strength with minimum weight is secured and to form the wheel with hollow tubular sheet metal spokes connected in a simple yet efficient manner to the rim and to the intermediate section.

Still another object is to secure, in a wheel having an annular cushion disposed between the rim portion and the hub, the freest possible action of the cushion, so that it will absorb the largest proportion of the shock possible.

A further object in this connection is to provide, in a wheel of the character stated in the last paragraph, a plurality of sets of power transmission or connecting members, connected respectively to the rim and to the hub, so arranged that while engaged power may be transmitted from the hub to the rim or vice versa, but that when the wheel is subjected to shock, only the fewest number possible of these members will resist the shock, thus obstructing as little as possible the free functioning of the annular cushion.

My invention is illustrated in the accompanying drawings, wherein.

Corresponding and like parts are referred to in the following description and indicated in all the views of the accompanying drawings by the same reference characters.

In the accompanying drawings, my invention is shown as applied to the driving wheel of an automobile, but I wish it understood that the invention is equally applicable to, and is also intended to be used on, the other wheels as well.

Referring to these figures, 2 designates a tubular axle housing of any usual or desired form and which forms no part of my invention. Passing through this housing is the axle 3, having at its end a head 4. In order to transmit the movement of the axle to the wheel, I have shown this head as formed with radially directed teeth 5 engaging with laterally projecting teeth 6 on a hub 7.

The axle housing 2 is formed inward of its end with the dust flange 8, and at both ends with spaced annular flanges 9 between which are mounted the antifriction rollers 9ª, which support the outer and inner ends of the hub 7, and permit the hub to rotate freely around the axle housing. The reduced outer end 7ª of the hub is exteriorly screw threaded for engagement with a hub cap 10 formed at its basal flange with a series of peripheral circular recesses 11 adapted to be engaged by a cap 44 which covers the opening through which access is had to the pneumatic tire filling pipe as will be later described.

Disposed between cap 10 and the head 4 is a spring 12 which acts to force the axle 3 inward and thereby keep the teeth 6 in engagement with the teeth 5. When the cap 10 is removed so as to relieve the pressure on the spring, the axle may be withdrawn in a manner well understood by those skilled in the art. Except for the recesses 11, the construction so far described is a common one and does not of itself form any part of my invention.

The exterior of the hub inward of the screw threaded portion 7ª, is formed with a beveled or inclined annular face 13, a face 14 transversely straight and parallel to the axis of the hub, a centrally and inwardly extending annular face 15, and a straight portion 16, having at its end a small flange or shoulder 19. At the junction of the portions 14 and 15 is an annular shoulder 20.

Extending concentrically around the hub but spaced therefrom and resting upon a bearing ring as will be later described, is a pneumatic cushion 21 in the form of a pneumatic tube. Preferably this tube is formed like a pneumatic tire of the clencher type, that is, its thickened base is split at 22 and provided with laterally projecting clencher flanges 23.

The pneumatic tube or cushion at one point in its base is provided with the air induction pipe 24 which extends down to a point beneath the base of the tube, then extends laterally and is provided with a cap 25. The terminal end of this induction tube is provided with the usual valve (not shown) adapted to be connected and actuated by an air pump tube.

Figure 6:
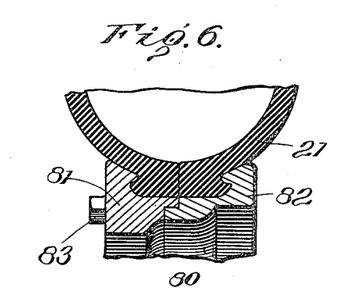
Fig. 6 is a section of a modified form of the bearing ring and a portion of the tire.

The cushion 21 is supported on a bearing ring preferably formed in two sections 26 and 26ª, as shown in detail in Fig. 6, held together by screw pins or bolts 26ᵇ, the section 26ª having a beveled exterior face screw threaded for engagement with a coacting screw threaded beveled face on section 26. Each section is formed with an outwardly projecting undercut lateral flange 27 adapted to engage over the corresponding clencher flange 23 of the cushion. Thus the two sections of the bearing ring are held in locking engagement with the cushion base and hold the pneumatic tube closed.

The bearing ring formed by the sections 26, 26ª seats on the face 14 of the hub 2 and has sliding rotative engagement therewith. The inner face of the ring is preferably cut away in a series of steps. Thus the inner face of section 26ª is still further cut away as at 29. The faces thus formed are transversely flat. The flat faces 28 and 29 are joined by a curved or beveled face 30.

Figures 2, 3:
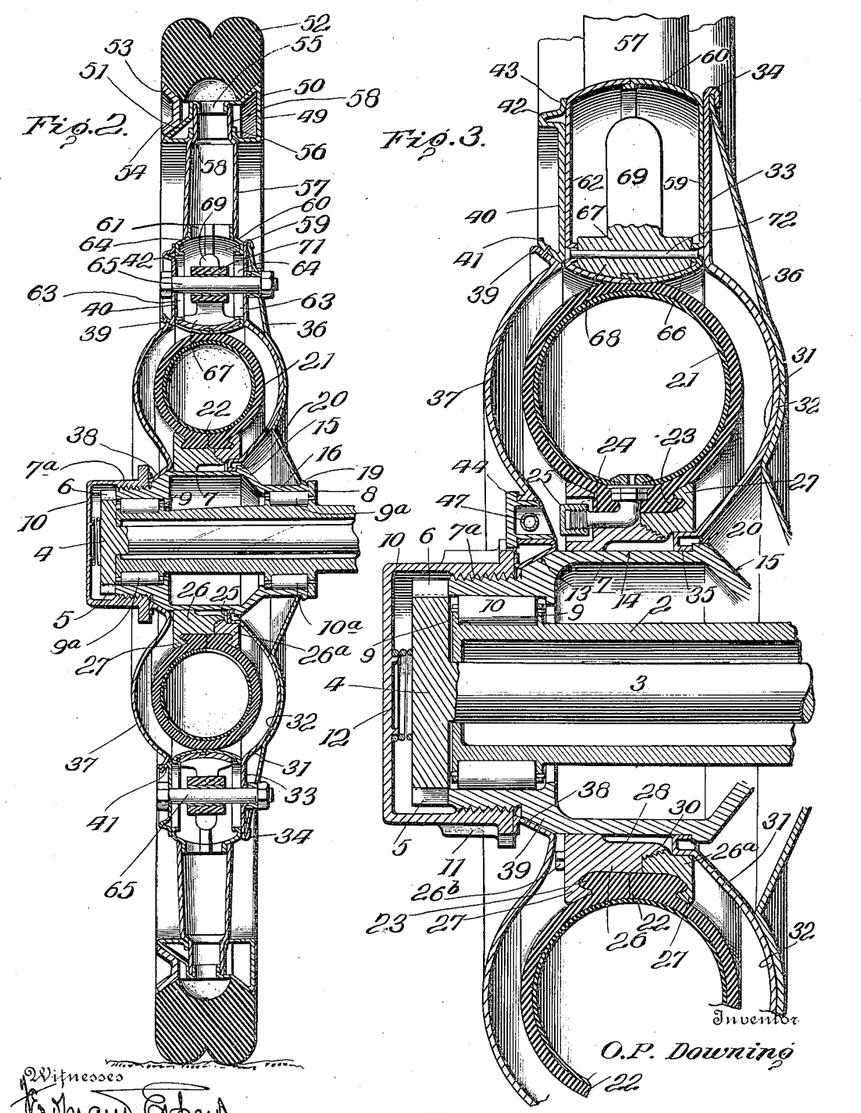
Fig. 2 is a diametrical section on the line 2—2 of Fig. 1.
Fig. 3 is an enlarged fragmentary section on the line 3—3 of Fig. 1.
Figure 4:
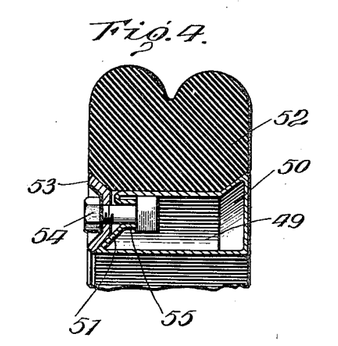
Fig. 4 is an enlarged section of the rim or felly of the tire.

While the outer portion of the bearing ring bears directly upon the hub, the inner portion of the ring is supported on the flat inside margin of a bead formed on an annular casing plate 31. This plate has an annularly bowed or concavo-convex portion 32 curved to approximately conform to the circular section of the cushion 21, and an annular flat portion 33, the margin of which is formed with an open, outwardly turned bead 34. The inner margin of the plate is bent upon itself to form an open bead 35 rectangular in section, which rests upon the hub and bears against the shoulder 20. The inner end of the bearing ring rests on this bead, as illustrated in Fig. 3, and it will be noted that the beveled portion 30 bears against this bead to prevent its displacement away from the shoulder 20. The bead 35 acts to strengthen and stiffen the margin of the plate 31 as does bead 34, the bead 34 forming also an annular pocket or fold for engagement with the outer margin of an annular stiffening or bracing plate 36, which extends diagonally inward, conforms for a portion of its width to contour of plate 31 and then extends diagonally inward again and bears against shoulder 19 on hub 2.

The face of the casing inclosing and protecting the cushion 21 is formed by an annular plate 37 which is radially bowed or curved into approximate conformity to the arc of curvature of tube 21 and which is formed on its inner margin with a flange 38 which rests on the face 13 of the hub and which may be detachably pinned thereto by one or more dowel pins or other attaching devices. The outer margin is formed with an outwardly projecting, circumferential flange 39. Extending out parallel to the portion 33 of the plate 31 is an annular plate 40 whose inner margin is flanged as at 41 and bears against flange 39. Preferably it is detachably pinned thereto though it may be attached in any other desired manner. The outer margin of plate 40 is bent outward and then inward as at 42 to form a fold and is then extended approximately in the same plane as the body of the plate, as at 43.

Figure 7:
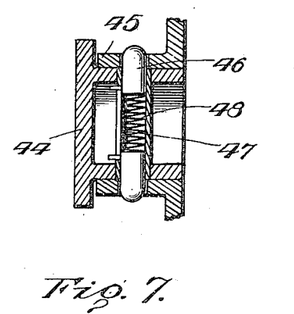
Fig. 7 is a sectional detail view of the cap which acts to hold the hub cap in place and which covers the opening whereby access is had to the air plug of the pneumatic cushion.

The plate 37 at its base is formed with a perforation, the metal at the margin of the perforation being outwardly flanged so as to strengthen the margin of the perforation or opening. In this opening as illustrated plainly in Fig. 7, is disposed a cap 44 which fits within the annular flange 45 of the margin of the opening and which is provided with the oppositely disposed detents 46. These detents are contained within a transversely extending tubular casing 47 and are forced outward in opposite directions by means of a spring 48. The outer ends of these detents 46 are rounded and are adapted to project through perforations formed in the flange 45. When the parts are in the position shown in Fig. 7, these detents hold the cap 44 from rotation or outward movement. When it is desired to remove this cap, the detents are forced inward by the fingers of the operator and the cap may be withdrawn.

Figure 1:
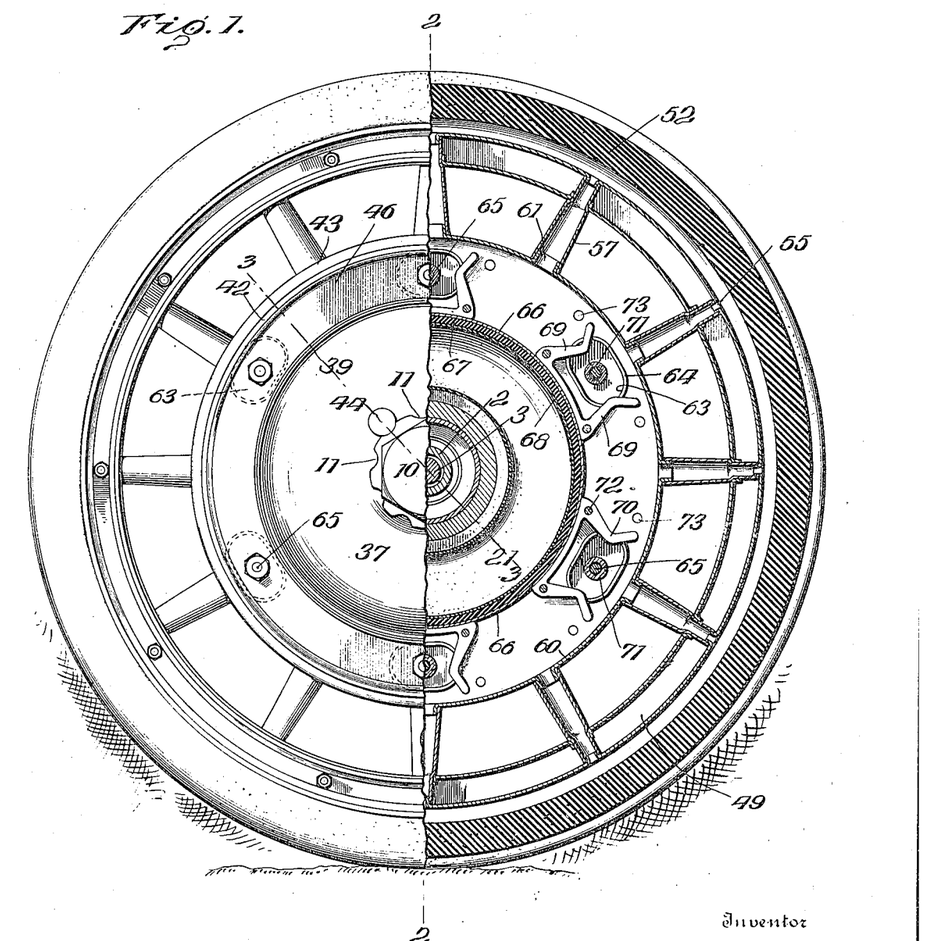
Figure 1 is an outer face view of a wheel constructed in accordance with my invention, half of the wheel being shown in section so that the internal construction may be observed.

As illustrated in Fig. 3, and in Fig. 1, this cap 44 is adapted to engage with any one of the recesses 11 formed in the cap 10, and when so engaged this 44 acts to lock the cap 10 upon the hub and prevent its being unscrewed. When the cap 44 is removed, however, the cap 10 may be unscrewed as before stated. It will likewise be seen from Fig. 3 that the cap 10 when it is screwed home bears against the flanged edge of flange 13 on plate 37 and thus holds the inner portion of the plate in place upon the hub and locks it from removal. When, however, the cap 10 is removed, the plate 37 may be slipped off of the hub so as to permit access to the pneumatic tube 21 and permit this tube to be repaired or replaced.

It is to be noted at this point that the inner margin of the plate 37 is held in place by the hub-cap 10, and that the hub-cap is held from accidental removal by the cap 44, and further that the cap 44 cannot become accidentally unscrewed because of the detents 46. The bearing ring 26, 26$^a$ is held from outward movement by the lower edge of the plate 37. If, by accident, the lower edge of plate 37 or the entire plate could move outward, the bearing ring could slip off its seat on bead 35, or slip off of the hub, and the wheel collapse. The locking of the cap 44, by means of detents, and the locking on of cap 10 is therefore of great importance.

The construction so far described, covers the hub and the intermediate section of the wheel, that is, the pneumatic cushion and casing therefor. I will now describe the rim or outer section of the wheel. The rim 49 is hollow and is formed of sheet metal. One side of the rim is formed with a flange 50 but the other side of the rim has a downwardly extending beveled face 51. The tire 52 may be of any suitable character but is shown as a solid rubber tire and is held in place by means of the locking ring 53. This locking ring is formed with a flat middle portion and two outwardly flared flanges. The inner one of these flanges fits upon the beveled face 51 of the rim while the outermost flange extends upward and outward against the beveled basal face of the tire 52. Bolts 54 pass through the locking ring 53 and through the rim 49, and it will be particularly noted that the nuts on these bolts are of such size as to be engaged between the outwardly flaring flanges 53 so that these flanges constitute locking means for the nuts. Additional lock nuts, however, may be provided if desired.

At a plurality of points the outer wall of the rim 49 is formed with perforations, the margins of the perforations being turned inward as at 55 while at a plurality of corresponding points the inner wall of the rim 49 is formed with a plurality of perforations, the margin of each perforation being inwardly turned as at 56. This construction provides sockets for the spokes 57. These spokes are hollow and approximately tubular in form, the upper end of each spoke being contracted as at 58 so as to be inserted within the flanges 56 and over the flanges 55. These flanges 55 and 56 therefore form a socket for each spoke and provide a very simple manner in which the tubular spokes may be connected to a hollow sheet metal rim.

The inner ends of the spokes are rigidly engaged with a hollow annular casing or spoke ring 59 which is approximately rectangular in section as illustrated in Figs. 2 and 3. The outer and inner walls of this casing, however, are outwardly bowed or curved. The outer wall 60 of the casing is formed at a plurality of points with openings, the material at the margin of each opening being outwardly bent or flanged as at 61 so as to be inserted within the butt end of a corresponding spoke 57. The side walls 62 of the casing are disposed parallel to each other and parallel to a plane at right angles to the axis of the wheel. These side walls are formed at a plurality of points with openings 63, the material at the margin of each opening being inwardly turned or flanged as at 64 whereby to strengthen the wall of the opening. This casing may be formed in any suitable or desired manner.

It will be noted from Figs. 2 and 3 that the plates 40 and 33 extend parallel to and lie flat against the side walls 62 of the casing 59. Passing transversely through the openings 63 and passing through the plates 40 and 33, are a plurality of bolts 65. As illustrated in Fig. 2, these bolts also pass through the strengthening plate 36 and spacing sleeves or bushings are disposed upon the inner ends of the bolts which pass through the perforations in the plate 36 and bear against the plate 33, thus holding the plates 31 and 36 apart.

Figure 9:
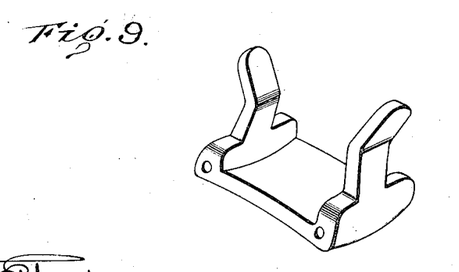
Fig. 9 is a perspective view of one of the transmission members.

Seated at intervals preferably in openings formed in the inner wall 66 of the casing 59 are a plurality of transmission members, one of these being shown in Fig. 9, each member being designated 67. Each transmission member is formed with a base 68 curved longitudinally in conformity with the circumferential curvature of the wall 66 and the under face of this base is slightly convexed laterally so that its under face is flush with the inner face of the wall 66. This wall 66 is transversely convex as illustrated in Fig. 3 so as to present a transversely convex face to the pneumatic tube 21 to avoid pinching this tube which would be the case were the wall 66 transversely concave.

At opposite ends of the base 68 of each transmission member there are disposed radially extending fingers or abutments designated 69. These abutments or fingers extend inward, that is, toward each other, and then outward or away from each other, the apex of this angle being designated 70. It will be seen that these abutments or fingers of the said members are each therefore reëntrantly angled with relation to the bolt 65 and that these abutments or fingers are disposed on each side of the bolt in greater or less spaced relation thereto. The apices of each pair of abutments or fingers are spaced from each other a distance about three inches, this distance being somewhat less than the length of the oval apertures 63. Mounted upon each bolt 65 is a roller 71 so that each bolt may have perfect freedom of movement over the face of the corresponding abutment fingers 70. The members 67 are held in position by means of transverse pins, bolts or rivets designated 72 which extend through the base of each member at opposite ends thereof and have heads extending through perforations formed in the metal of the side walls 62 of the casing 59, the metal around these bolt apertures being inwardly turned so as to reinforce the margins of the apertures.

The operation of the invention so far as described and when running over smooth roads will be, of course obvious. The transmission members 67 coacting with the bolts 65, act to operatively connect the outer section of the wheel with the inner section thereof and transmit power from one section to the other. Under normal working conditions, the rollers 71 on each bolt 65 will be in contact with one of the fingers 69 of each pair of fingers, depending upon which direction the wheel is running. In Fig. 1 the bolt 65 and rollers are shown as disposed in an entirely neutral position. This, however, is for the purpose of clearly showing the mechanism. In the diagrammatic view, Fig. 8, the bolts are shown as being in engagement with one finger or abutment of each pair of abutment fingers, the wheel being assumed to be moving in the direction of the arrow. It will, therefore, be seen that a rotary motion communicated to the hub by the axle 3 will be transmitted through the plates 31, 36 and the plates 37 and 40 to the bolts 65 and that as these bolts contact with the forward abutments or fingers 69, the motion of the bolts will be transmitted to these abutments or fingers, thence to the casing 59 and through the spokes to the rim of the wheel. It will be plain, however, that the outer section of the wheel comprising the rim, the spokes, the casing 59 and the members 67 may have a reverse rotation relative to the central section of the wheel—a distance equal to the distance between the apices of each pair of fingers or abutments and that then the bolts 65 will contact with the opposite fingers to those just referred to.

The transmission members are preferably steel and the abutment fingers 69 are slightly resilient. When the wheel is rotating steadily in the direction of the arrow, Fig. 8, all of the bolts 65 will bear against the forward abutment fingers 69 and the force transmitted to the wheel will be distributed throughout all the members and thus equally distributed to all of the wheel. Under these circumstances, any one abutment finger will receive only a portion of the force transmitted and this will not be sufficient to deflect this finger to any extent.

Certain abutment fingers will be resiliently deflected, however, when a sudden jar or shock comes upon the wheel as will be described in the next paragraph, and in order to prevent too great a bending of the abutment fingers and to distribute the strain on these fingers, I provide a plurality of transversely extending pins or bolts designated 73 and disposed adjacent to but spaced from the outer end of each abutment finger so that when the abutment finger is deflected beyond a certain point, it will contact with this stud or pin and the force will be transmitted to the casing 59.

Figure 8:
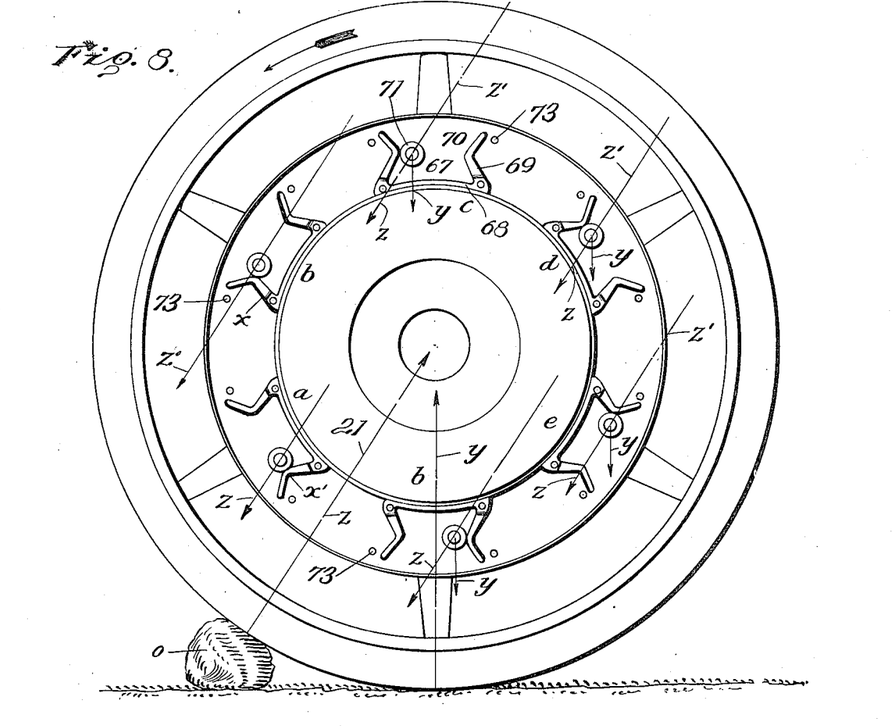
Fig. 8 is a diagrammatic face view of the wheel to show the cushioning action of the wheel under varying circumstances.

The action of the wheel under the strain due to passing over rough roads is illustrated in the diagram, Fig. 8. In this figure only so much of the wheel is illustrated as is necessary to show the action of the transmission members. The members 67 are designated $a$, $b$, $c$, $d$, $e$ and $f$. The vertical arrows Y which pass through the bolts or pins 65 show the direction of movement of these members when the wheel is subjected to a purely vertical strain and there is no, or very little, impediment to the forward movement of the wheel. The diagonal arrows $z$ indicate the direction of movement of the members when the wheel is subjected to a diagonal strain or stress due to striking an impediment.

Assuming that the wheel is traveling over a moderately rough road, normally the bolts or pins 65 when the pneumatic tube is properly inflated will be disposed, each opposite the apex of the forward abutment finger 69 and this is the position of the bolts shown in the diagram. Now if a vertical jar is communicated to the wheel, it will be obvious that the axle and hub portion will move downward relative to the outer section while the outer section of the wheel will move upward relatively to the central hub section, this movement being cushioned by the tube 21. Thus all of the pins or bolts 65 will move downward and all of the members 69 will move relatively upward.

With the parts as illustrated in the diagram, it is plain that the pin 65 coacting with the member $f$ has free movement vertically downward, that the pin coacting with the member $e$ also has free movement vertically downward, and that this is also true of the pins of the members $d$ and $c$. The angular portion $x$ of the member $b$, however, does not at this time lie in a vertical plane but this portion $x$ is inclined downward and rearward. As a consequence, the pin or bolt 65 of the member $b$ will engage the lower portion $x$ of the forward abutment finger of member $b$, and the vertical shock due to running over rough roads will be transmitted from this last named bolt or pin to the forward finger of the member $b$. The same may be said with regard to the member $a$.

With the parts illustrated in the diagram, the portion $x'$ of the forward abutment finger of member $a$ will engage with the pin or bolt of this member upon a downward movement of the pin or bolt and will transmit the shock received by the wheel to this abutment finger.

In practice the pneumatic tube will, of course, receive about 50 per cent. of the shock and the remainder of the shock will be transmitted mainly to the member $b$ and partially to the member $a$. If this shock is so great as to deflect the forward fingers of the members $a$ and $b$ until these fingers engage with the pins 73, this shock will be further distributed.

The diagonal arrows $z$ are drawn on lines indicating the direction of shock transmitted when the wheel meets a relatively large obstruction, as for instance the obstruction $o$. It will be obvious that the line of transmission of this jar or shock will always be from the obstruction through the axle and the parallel lines $z'$ indicate the direction of this shock in the diagram.

While the action of the wheel under the shock of meeting a relatively large obstruction is very nearly that of the wheel when traveling over ordinarily rough roads, yet it is not quite the same. Thus when the wheel meets the obstruction, the bolt 65 of the member $f$ will be free to move downward and forward following the arrows $z$. The bolt of the member $e$ is also free to move in the direction of the arrow. The bolt of member $d$ is likewise free to move in the direction indicated as is the bolt 65 of the member $c$. Here again, however, the bolt of the member $b$ is prevented by its engagement with the portion $x$ of the forward abutment finger, from moving in the direction of the arrows $z$ and therefore the shock of meeting the obstruction is transmitted to this member $b$. The bolt of member $a$, however, is entirely free to move in the direction of the arrow $z$. While I have referred to the bolts 65 and the hub section of the wheel as moving downward under shock, it will be evident that this motion is partly relative and that the rim section and transmission members also move upward relative to the hub and bolts 65.

The object of the transmission members is as follows: It is necessary to provide some power transmitting means for connecting the hub section to the rim section so that they may rotate in common, but this means must permit the rim section to take an eccentric position relative to the hub section, under pressure from any direction,—as, for instance, under the effect of load, or a vertically diverted shock, or a shock in advance of the vertical center of the wheel. If now the abutment fingers 69 were radially directed and set so close together as to only permit a radial movement of the bolts, it is obvious that the rim section could not take an eccentric position relative to the hub. If now the space between these abutments be enlarged to permit a forward or backward movement of the bolts 65, as well as a radial movement, the wheel would operate, to a certain degree. Downward vertical movement of the hub could occur, but this vertical movement would be impeded by a number of transmission members and to this extent the cushion would not be permitted to fully actuate, its cushioning effect would be lost and there would be a considerable decrease in the elasticity of the wheel. One of my objects is to so form these transmission members that they will impede the movement of the bolts and be impeded by them as little as possible, so that the cushion may have as much chance to actuate as possible. This object I attain through the peculiar form of my transmission members and by making the fingers or abutments of the members resiliently yielding, I secure a yielding engagement between the members and the bolts 65, so that the shock borne by the members and the bolts is itself cushioned and reduced.

It is to be noted that the bolts 65 and the members 69 constitute power transmitting members, transmitting movement from the hub section to the rim section and vice versa, and that I use a plurality of sets of these members each set consisting broadly of an abutment or finger and a bolt 65. These coacting abutments and bolts or pins 65 have a driving engagement with each other to cause a coincident rotary movement of the hub and inner section, but these coacting members also have free relative movement both radially relative to the hub and tangentially relative to the hub.

There is another very vital part of this invention whose construction has been heretofore explained, namely, the bearing ring 26. The pneumatic tube 21 has a constant creeping action with reference to the hub, and if this pneumatic tube contacted directly with the hub, there would be a more or less constant bias strain or pull on the tube and as a consequence the tube would in a relatively short time be torn apart or become so distorted that it would be useless. It is for this reason that I provide the ring 26. This ring not only forms the means for holding the split portions of the tire in engagement with each other, but it forms a bearing which rests upon and moves over the bead 35. As before stated, the tire has a constant creeping movement and this floating ring moves with the tire and bears upon the face of the hub 7. This ring is therefore of great importance and is one of the main factors in making a resilient wheel of this type practical. The bearing ring is formed with a stepped inner face to permit the ring being readily inserted on the hub or withdrawn. If this ring fitted the hub perfectly it would be liable to bind when being slipped on the hub, but this is not the case where the inner face is stepped as described.

The pneumatic cushioning tube 21 is entirely housed and protected by the plates 31 and 37 so that no harm can come to it. By removing the hub cap 10, however, the plate 37 may be readily removed, the dowel pins in flanges 39 and 38 merely acting to prevent a rotation of the plate 37 with relation to the hub and plate 40 but not impeding the removal of plate 37.

Figure 5:
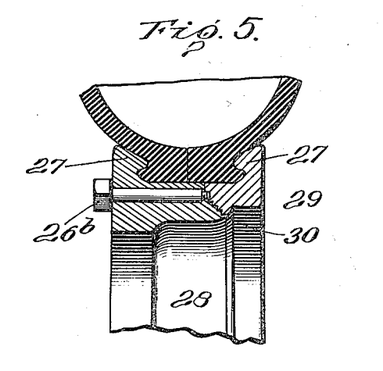
Fig. 5 is an enlarged section of one form of floating bearing ring and a portion of the tire.

While I have illustrated what I believe to be the best form of my invention and one which I have found to be thoroughly effective in practice, it is to be understood that I do not wish to be limited to the details of construction nor to the precise arrangement of parts as it is obvious that many minor changes might be made within the scope of the claims without departing from the spirit of the invention. For instance, the bearing ring 26 need not be made in two sections having screw threaded engagement with each other but might be made as in Fig. 6 of two sections having simply an interlocking engagement and held in place by means of bolts. In this figure, 80 designates the bearing ring as a whole and 81 and 82 designate the two sections. The inner ends of these sections are rabbeted so that one will fit into the other and these sections are held together by bolts 83 as previously described for the construction shown in Fig. 5.

Wheels constructed in accordance with my invention have been practically tested by me upon automobiles and have demonstrated their practicability. These wheels have an elasticity much greater than that of ordinary automobile wheels provided with pneumatic tires and most successfully withstand the shocks, jars and strains to which the wheel is ordinarily subjected.

It is pointed out that while the wheel as illustrated is constructed of sheet metal, yet I need not necessarily make this wheel of sheet metal. I prefer to use sheet metal, however, for the construction of the wheel as this will be much lighter and much cheaper than if the parts of the wheel were forged or cast. Furthermore, by forming the sheet metal plates with apertures having inwardly turned or flanged margins, and by forming the margins of the plates with inwardly turned beads or flanges, I very greatly stiffen these plates so that they will resist strain. This is particularly true of the inner plate 33, and this inner plate 33 is further strengthened by means of the plate 36, this being necessary because of the fact that it is the inner side of the wheel which has to resist most strain where the automobile is turning or running on a curve. This is the reason for using this auxiliary bracing plate 36 upon the inner side of the wheel.

Having thus described the invention what is claimed as new is:—

1. A resilient wheel including a wheel hub having forward and rear axle engaging portions, an outer rim section, an intermediate cushion section disposed between the hub section and the outer section, a bearing ring disposed between the cushion and the hub, the interior face of the bearing ring being cut away to form a series of steps, the rear portion of the bearing ring being spaced from the adjacent portion of the hub, an annular casing plate surrounding the hub section at the rear end thereof and extending radially beyond the cushion, the central margin of said casing plate being inwardly bent and resting upon the rear end of the hub section and supporting the rear spaced end of the bearing ring, a front face plate surrounding the hub and bearing thereon and extending beyond the cushion and parallel to the first named plate, spokes carried by the outer section and having their inner ends disposed between the outer margins of the said face plates and resting upon the said cushion, and operative connections between said facing plates and the inner ends of the spokes permitting the outer section to have radial movement relative to the said plates and to the hub section.

2. A resilient wheel including a hub, an outer rim, a casing plate detachably mounted on the hub, a member having screw-threaded engagement with the hub and holding the casing plate in place, and detachable locking means carried by the casing plate and engaging said screw-threaded member to prevent its rotation.

3. A resilient wheel including a hub, an outer rim, a casing plate detachably mounted on the hub, a member having screw-threaded engagement with the hub and holding the casing plate in place, a projecting annular member on the casing plate, an annular cap fitting into said member and having a locking engagement with the casing plate holding member to prevent its rotation, and a spring actuated detent on the cap engaging the annular member on the casing.

4. A resilient wheel including a hollow hub, a floating ring mounted upon the hub, a cushion carried by the floating ring, outer and inner casing plates detachably mounted upon the hub and inclosing said cushion, said plates being formed of sheet-metal, the margins of the sheet metal being flanged and beaded, a rim section, spokes extending inward from the rim section, a spoke-ring to which the inner ends of the spokes are connected and disposed between said casing plates and resting upon the annular cushion, a plurality of abutment members disposed within and mounted on the spoke-ring and including each a pair of spaced abutments, the sides of the spoke-ring being apertured opposite said abutments, and transverse bolts mounted upon the casing plates and extending through said openings and each between a pair of said abutments.

5. A resilient wheel including a hub, an annular cushion surrounding the hub and mounted thereon, a rim section having inwardly directed spokes, a spoke-ring carried by the spokes and resting upon the cushion, an outer sectional plate detachably mounted upon the hub and covering the cushion and the hub ring, an inner plate mounted upon the hub and covering the cushion and the hub-ring, said inner plate being outwardly bowed adjacent its central portion, the inner edge of the plate being formed with a bead and the outer edge of the plate being formed with an open bead, and an annular strengthening web mounted upon the hub extending in a diagonal plane outward and toward the front of the wheel and bearing against the said inner plate, the margin of the said strengthening web being inserted in the open bead upon the margin of the first-named plate.

In testimony whereof I affix my signature in presence of two witnesses.

OTTO P. DOWNING. [L. S.]

Witnesses:
FREDERIC B. WRIGHT,
J. D. YOAKLEY.